3,415,772
PROCESS FOR THE PREPARATION OF POLYMER
SOLUTIONS FROM POLYMER LATICES
Gerardus E. La Heij and Jacques A. Waterman,
Amsterdam, Netherlands, assignors to Shell Oil
Company, New York, N.Y., a corporation of
Delaware
No Drawing. Filed July 13, 1964, Ser. No. 382,368
Claims priority, application Netherlands, July 16, 1963,
295,362
9 Claims. (Cl. 260—33.6)

ABSTRACT OF THE DISCLOSURE

Polymer solutions are prepared from a latex of the polymer by creaming the latex, contacting the creamed latex with a polymer solvent to form a solution of the polymer in the solvent and then separating the organic solution from the aqueous components of the original latex.

---

This invention relates to the preparation of solutions of polymers from their latices. In this specification and the pertaining claims the expression "polymers" is used to designate homopolymers as well as copolymers. In particular, the invention relates to the preparation of pure polymer solutions, i.e., solutions containing hardly (if any) electrolytes, dispersants or other aids, which are present in the latices as a result of the way in which they have been obtained or of subsequent treatments. The invention is particularly important for the preparation of solutions of polymers of conjugated dienes.

A customary method of separating polymers from latices is by coagulation, the above-mentioned aids or other contaminants remaining behind in the coagulum. Direct removal of the contaminants from the coagulum by extraction is often cumbersome or even impossible. This extraction is a very laborious process, and often involves the necessity of using special expensive extractants. Besides dissolving the coagulated polymers is often a very laborious and time-consuming process. The preparation of pure solutions of the polymers via the coagula, if not precluded, is therefore in any case unattractive.

Now, in accordance with the present invention, a polymer solution is prepared from a latex without first coagulating the polymer. Instead, a polymer solvent phase which is substantially insoluble in water is caused to act upon polymer, which is present as a cream. Coagulation is avoided, but, if necessary, conditions have to be created which promote the creaming of the latex. The undesired contaminants are held or enclosed by the polymer particles hardly if at all.

As a result of the contact of the creamed polymer with the solvent phase, the polymer swells and/or dissolves. This contact may take place in the presence of the serum layer or after separation of the serum layer or part of it. In any case, a swollen and/or dissolved polymer mass is obtained, which still contains a quantity of serum and this polymer mass is caused to segregate, that is to split into a layer of organic material and an aqueous layer.

This segregation takes place more easily as the polymer particles have swollen more and/or have dissolved to a larger extent. After a thorough action of the solvent on the creamed polymer the segregation may as a rule even occur spontaneously, i.e., within a short time and merely by means of gravity. If necessary, the segregation may be facilitated and accelerated by centrifuging. Suitable apparatus for centrifuging is a decanting centrifuge or a hydrocyclone.

The invention may be defined as relating to a process for the preparation of solutions of homo- and/or co-polymers from their latices in which polymer creamed from a latex is contacted with a liquid phase which is a solvent for the polymer and is substantially insoluble in water, and the swollen and/or dissolved polymer mass thus formed is caused to segregate by gravity and/or centrifuging.

Creaming of polymer dispersions is well known to those skilled in the art. The phenomenon of creaming is a result of decreased stability of the latices. The stability is decreased by addition of creaming agents or by freezing. Another result of the decreased stability is, that the polymer particles are readily accessible for the solvent which causes the polymer particles to swell and/or dissolve.

Preferably, electrolyte solutions are used as creaming agents. Suitable examples are alkaline or acid solutions of sodium chloride or ammonium chloride. If latices are stabilized by anion-active emulsifiers they may be creamed by addition of cation active emulsifiers as creaming agents. Other creaming agents are, for instance, alginates, polyvinylalcohols, polymethyl methacrylates and carboxymethyl cellulose.

The term "cream" usually means a concentration of polymer particles in a top layer. If, however, the polymer particles should be heavier than the aqueous phase, they would tend under conditions of decreased stability to sink and to collect in a bottom layer. As used in the present specification the term "cream" also comprises such a bottom layer. The expressions "creaming" and "creamed" are used in the corresponding broad sense.

If solvents are added to aqueous polymer dispersions of very high concentration a phase inversion may result. The water which is at first the continuous phase is turned into a discontinuous phase in this inversion. In this case, there is no creaming. Further addition of water after the phase inversion would result in coagulation of the polymer. The invention does not relate to treatments of the dispersions which provoke phase inversion. In the process of the invention creaming is essential. Therefore, if in the process of the invention, the solvent phase is added to the latex before creaming, so much water must be present that there is no phase inversion.

The solvent phase may be added to the latex before, during or after creaming. In any case the solvent is contacted with and acts upon the creamed polymer.

The term "substantially insoluble in water" (with reference to the polymer solvent) should be understood as referring to solvents which are soluble in water to less than 1% by weight at a temperature of 20° C. The action of the solvent phase on the polymer particles is often promoted by applying temperatures higher than room temperature, for example, between 40 and 250° C. When temperatures of up to 100° C. are used, the mixture of cream, solvent and serum may, for instance, be heated in a vessel with a reflux condenser; a treatment at higher temperatures than 100° C. requires superatmospheric pressures. In some cases, however, room temperature is preferred. The contact between the creamed polymer and the solvent phase may further be intensified by stirring.

If sufficient swelling or solution of the polymer particles has been obtained, a spontaneous segregation of the swollen and/or dissolved polymer mass will often occur as soon as the mixture has come to rest. The degree of swelling (dissolving) is dependent, not only on the nature of polymer and solvent, but also on the ratio of solvent to polymer, on the temperature and the duration of the contact between the solvent phase and the polymer. In each case, the proportion, temperature and duration of contact required may easily be established experimentally. If spontaneous segregation does not occur centrifuges may be used. In many cases low rates of rotation of these centrifuges will suffice.

In order to avoid polymer losses, the contact between the creamed polymer and the solvent phase is preferably established in the presence of the whole serum layer or a relatively large part of it, for example, at least one-fourth of the total serum. If only part of the serum layer is present during the treatment with the solvent, the average polymer concentration in this part preferably should be higher than the average polymer concentration in the serum layer as a whole.

As a rule, the segregated polymer mass consists of a mixture of swollen polymer and polymer solution. Further, a small quantity of serum and part of the aids (auxiliary substances) which have been used in the preparation of the latex and/or in the creaming will be present in the mixture. These aids include: dispersants, stabilizers, remnants of polymerization catalysts, materials with which the molecular weight has been modified ("modifiers"), electrolytes, etc. For several applications of the polymer solutions, the presence therein of one or more of these substances will be undesirable. Usually, it is desired to remove at least the water, the emulsifiers and the electrolytes from the polymer mass. The removal can best be carried out by first discharging the serum layer as completely as possible and next extracting the remaining layer of swollen and/or dissolved polymer mass.

As an extracting agent water is in most cases very effective. It may be desirable, however, to perform the extraction with alkaline aqueous solutions, for example, with a solution of an alkali metal hydroxide in water or aqueous ammonia. In this way, remnants of mercaptans, which are frequently added as modifiers during the preparation of latices of diene polymers can be extracted. Recommended is an extraction first with water, then with an aqueous alkaline solution and finally again with water.

To ensure that, for example, emulsifiers and electrolytes are extracted as completely as possible, the extraction is as a rule continued till these substances can no longer be detected in the extract phase discharged. Thus, in certain cases the extract phase can be checked for the presence of, for example, ionic emulsifiers, by establishing whether on acidification with concentrated sulfuric acid turbidity still occurs.

After completion of the extraction and removal of the extract phase, the polymer solution (raffinate phase) is preferably freed from remaining water by coalescing, distillation, freezing and/or treatment with an adsorbent. Coalescing is effected by contacting the polymer solution with coalescing agents, such as polypropylene wool, steel wool, Raschig rings, powdered coal, etc. If necessary or desired the distillation is carried out in vacuo. If the solvents applied for dissolving the polymer and the extractants used are suitable for this purpose, the distillation may be an azeotropic one. Suitable adsorbents are, for example, activated carbon, terrana, filter aids, molecular sieves, etc. Recommended is first treating the polymer solution with a coalescing agent and removing the coalesced water, thereafter distilling off remaining water and finally removing the last traces of water by treatment with an adsorbent.

The polymers of which solutions are prepared, may be homo- and/or copolymers of compounds with one or more olefinically unsaturated bonds in the widest sense. Examples are homo- and copolymers of vinyl chloride, viyl acetate, acrylic and methacrylic esters, styrene, acrylonitrile and in particular homo- and copolymers of conjugated dienes, for example, butadiene, isoprene, piperylene, cyclopentadiene or chloroprene. Also natural rubber latices can be treated according to the invention, pure rubber solutions being the result.

Latices of synthetic polymers may contain unconverted monomer. This is frequently removed before the treatment with solvent, but also removal during or after treatment with solvent is possible.

The average molecular weight of the polymers may vary within wide limits. A special category is constituted by the polymers whose intrinsic viscosity (IV), if desired from viscosity measurements in solutions of toluene at 25° C., is below about 1 and whose average molecular weight is between 100 and 12,000, which polymers are often liquid or semi-solid. Especially solutions of homo- and/or copolymers of butadiene and/or chloroprene of these low molecular weights are important. As far as homo- and/or copolymers of butadiene, isoprene and/or piperylene are concerned also the polymers with average molecular weights of 12,000–1,000,000 are important.

The process according to the invention is very attractive if the emulsifiers present in the latex are highly soluble in water and consequently are readily removable by washing with water. This is, for example, the case with the water-soluble salts of saturated, cycloaliphatic or branched, saturated acyclic carboxylic acids. Very suitable representatives of this class of emulsifiers are the water-soluble salts of saturated cycloaliphatic or branched, saturated acyclic carboxylic acids, which contain at least 8 and at most 40 carbon atoms per molecule and in which the carboxyl groups are bound to tertiary and/or quaternary carbon atoms. Such carboxylic acids can be obtained by causing monoolefins, preferably monoolefins with 10 to 20 carbon atoms per molecule or mixtures thereof, to react with formic acid or with carbon monoxide and water.

The solvent phase is preferably composed of hydrocarbons, which may be aliphatic, cycloaliphatic and/or aromatic hydrocarbons. Suitable examples are isooctane, gasoline, white spirit with a boiling range of 130–180° C., cyclohexane, methylcyclohexane, benzene, toluene, etc. Other suitable solvents are halogenated hydrocarbons. Suitable boiling points or boiling ranges for the solvent phase are mainly between 35° C. and 250° C. Special importance have solvents whose viscosity is low, for example lower than 1 centipoise at 25° C. It has been found that even a slight decrease in viscosity of the solvent may result in a strong drop in viscosity of the polymer solution. The presence of water soluble organic liquids is undesirable as they often provoke partial coagulation of the polymer.

To prepare concentrated polymer solutions the creamed polymer may be contacted with a solvent phase in which a quantity of polymer has previously been dissolved. Often the latter polymer is identical with the polymer present in the latex. For this purpose, for example, a polymer solution obtained according to the present process is used for the treatment of a new batch of creamed latex. It is also possible, however, to use a solvent phase in which, before contact with the creamed polymer, a completely different homo- and/or copolymer has been dissolved, for example, a polymer with a different chemical composition and/or different molecular weight.

The solutions obtained according to the invention may, dependent on the nature of the polymer, the solvent applied and the concentration of the polymer, be used for various purposes. Thus, solutions of diene homo- and/or copolymers, in particular if these polymers have a molecular weight between 100 and 12,000, may be used as adhesive or as lacquer and/or varnish and in particular as metal lacquers such as for can coating.

To modify the dissolved polymers, for example in the case of diene polymers, the polymer in the solution obtained may be subjected to a chemical conversion. Thus, for example, hydroxyl and/or carboxyl and/or ester groups may be formed in the polymer blowing oxygen or air through the solutions preferably after addition of metal driers (compounds of Co, Fe, Ni and Mn). The solutions modified in this way are also suitable for use as lacquers and/or varnishes.

Furthermore, the solutions obtained according to the invention are pre-eminently suitable for hydrogenation in the liquid phase. Owing to the purity of these solutions the hydrogenation may be carried out with Ziegler type catalysts. In polymer solutions prepared from polymer dispersions via coagulation, Ziegler type catalysts show a decrease in activity through the presence of emulsifiers, electrolytes and creaming agents.

The solutions to be hydrogenated with Ziegler type catalysts are, preferably in advance, freed from molecular oxygen, for example by passing through nitrogen.

The process according to the invention, can, if desired, be performed continuously.

EXAMPLE I

A copolymer of butadiene and styrene was prepared by emulsion polymerization of 5° C. according to the following recipe:

|  | Parts by wt. |
|---|---|
| Butadiene | 70 |
| Styrene | 30 |
| Emulsifier—sodium salt of acids ex $C_{14}$–$C_{18}$ cracked olefins[1] | 4.0 |
| Water | 170 |
| Stabilizer—Tamol-N (mixture of sodium alkylaryl sulfonates) | 0.02 |
| Electrolyte—tertiary sodium phosphate ($Na_3PO_4 \cdot 12$ aq) | 0.70 |
| "Modifier"—tertiary dodecylmercaptan | 3.0 |
| "Activator"—ferrosulfate ($FeSO_4 \cdot 7$ aq) | 0.04 |
| Activator—disodium salt of ethylene diamine tetraacetic acid with 2 moles of water of crystallization | 0.05 |
| Sodium formaldehyde sulfoxylate 2 aq | 0.10 |
| Water | 10.0 |
| Initiator—paramenthane hydroperoxide | 0.12 |

[1] See J. of Applied Chem. 12 (1962), 469–478.

The polymerization was continued until a 62% conversion of the monomers was obtained. The polymerization reaction was stopped by adding 0.15 part by weight of sodium dimethyl dithiocarbamate, dissolved in 10 parts by weight of water, to the reaction mixture. After the reaction had been stopped the non-converted monomer was removed by distillation with steam.

To 100 parts by volume of the latex thus obtained, which contained 20% w. of solid material, was added 18 parts by volume of a solution of 20% w. NaCl in water, which solution had been brought to a pH of 10 by adding NaOH. Subsequently, a cream layer formed at the upper side of this portion of latex. Thereupon to the latex thus destabilized was added 100 parts by volume of petroleum white spirit with a boiling range of 130 to 180° C. and a viscosity of 0.8 centipoise at 25° C. The mixture was then heated to 100° C. for about one hour while being stirred, the vapors formed, after condensation to liquid, being recycled to the mixture with the aid of a reflux condenser.

After one hour, heating was stopped and the mixture was allowed to cool down to 80° C. Spontaneous separation of the mixture into two layers occurred. Besides white spirit with polymer dissolved in it, the upper layer also contained solvent-swollen polymer particles, water and a quantity of non-polymeric components (soap and electrolyte). The bottom layer, the serum layer, mainly consisted of water with a quantity of the other non-polymeric components dissolved in it. The polymer concentration in this layer was lower than 0.1% w.

The bottom layer was separated from the top layer by discharging the bottom layer. The polymer-containing top layer was then extracted by shaking four times with 100 p.b.v. (parts by volume) of water. During the washes the swollen polymer particles were further destabilized and dissolved in the white spirit. The top layer thus freed from the non-polymeric components originating from the destabilized latex was then heated to 130° C. and the water left in the polymer solution and part of the white spirit were distilled off. After the polymer solution had cooled down to 80° C., 2% w. (calculated on polymer solution) of terrana was stirred in, which after 15 minutes was removed again from the solution by filtration through a glass filter. The remaining clear polymer solution in which the presence of emulsifier and electrolyte could no longer be demonstrated, contained 25% w. of the styrene/butadiene copolymer. This copolymer had a content of bound styrene of 23.0% w., and the intrinsic viscosity was found to be 0.20.

After concentration to a polymer content of 50% w. by distillation the polymer solution obtained was used to apply a polymer film to tinplate and steel. The thickness of the films still containing solvent amounted to 0.03 mm. These films were dried and cured at 200° C. for 20 minutes, as a result of which the thickness reduced to 0.015 mm. The properties were then as follows:

| | |
|---|---|
| Adhesion (according to DIN 53151) | 1 (excellent) |
| Flow behavior | Good |
| Erichsen impact resistance on tinplate mm | 5.5 |
| Erichsen impact resistance on steel of 1 mm. thickness mm | 3 |

After heating of the film applied in tinplate with superheated steam of 125° C. (sterilization conditions) for 30 minutes the bending test (mandrel bend test) according to the directions of the Ministry of Defense, London, DEF 1053, method 13, gave 1/16 inch. The pencil hardness, determined according to the directions W3K56/18 of the "Vereniging voor Verf en Verfresearch" of 14–9–1956, could be indicated by H. This hardness was maintained when the film was kept in contact with xylene for 15 minutes by means of a piece of cotton wool which had been soaked in this liquid.

EXAMPLE II

According to the procedure indicated in Example I, a latex was prepared of a butadiene-piperylene copolymer by copolymerizing these monomers in a feed ratio of 75 p.b.w. of piperylene and 25 p.b.w. of butadiene.

The recipe used for this polymerization was distinguished from the one given in Example I by the absence of tertiary dodecylmercaptan and by the fact that the total quantity of water amounted to 200 instead of 180 p.b.w.

The polymerization was stopped according to the procedure indicated in Example I when a 61% conversion of monomers had been reached. After removal of the non-converted monomers by distillation with steam the latex was further treated as described in Example I with the difference that isooctane was used as a solvent instead of white spirit.

After the spontaneous segregation the top layer was washed five times with an equal volume of water, heated in the same way as indicated in Example I and treated with terrana. The ultimate result was a clear 18% w.

solution of the piperylene-butadiene copolymer in isooctane.

The intrinsic viscosity of the copolymer amounted to 1.6, while by means of infrared analysis a piperylene content of 39% w. and a butadiene content of 61% w. were measured. The polymer solution was then diluted to a polymer concentration of 8% w. with 2,2,4-trimethylpentane, after which nitrogen was passed through in order to remove oxygen. The solution thus obtained was then subjected to a hydrogenation in the presence of a catalyst of the Ziegler type, during which process the number of double bonds in the copolymer was easily reduced to less than half.

EXAMPLE III

By polymerizing 100 p.b.w. of butadiene in almost the same way as described in Example I, a polybutadiene latex was prepared which contained about 30% w. of solids after distillation with steam. The recipe used differed from the direction given in Example I in that the total quantity of water amounted to 150 instead of 180 p.b.w., the quantity of soap to 3.0 instead of 4.0 p.b.w. and the quantity of tertiary dodecylmercaptan to 4.0 instead of 3.0 p.b.w. The polymerization was stopped in the way indicated in Example I when a 55% butadiene conversion had been reached. Any monomer left was expelled with steam.

As in Example I, 100 p.b.w. of the latex was creamed with NaCl and treated with white spirit.

The polymer-containing top layer was successively washed twice in an equal volume of water, an equal volume of 3% w. aqueous NaOH-solution, and, finally, twice with an equal volume of water. After removal of the water by means of distillation and after treatment with terrana as in Example I, a clear 20% w. polybutadiene solution resulted. In this solution the presence of organic or inorganic salts could not be demonstrated. The solution was used as a solvent for the treatment of a second batch of 100 p.b.v. of the same latex (after creaming with NaCl). This treatment was otherwise carried out in the same way as that of the first batch. The clear solution obtained in this case contained 50% w. of polybutadiene. The intrinsic viscosity (IV) of the polymer was 0.16.

The latter solution was used to apply a polymer film to tinplate and steel. The thickness of the films was equal to that in Example I. After the films had been cured by heating at 200° C. for 20 minutes they were found to have the following properties:

Adhesion (DIN 53151 rating 1) _____ Excellent
Erichsen impact resistance on tinplate _____mm__ 4.0
Erichsen impact resistance on steel of 0.5 mm. thickness _____mm__ 2
Flow behavior _____ Good
Bending test after heating with steam (see Example I), inches _____ 1/16
Hardness (see Example I) _____ H
Ditto after treatment with xylene _____ H

EXAMPLE IV

A copolymer of butadiene-styrene was prepared according to the recipe given in Example I, with the difference that 2.0 instead of 3.0 p.b.w. of tertiary dodecylmercaptans were now used. The reaction was stopped when at 64% monomer conversion had been reached.

The latex, which contained 22% w. of solid matter after distillation with steam, was further treated as described in Example I. The finally resulting clear polymer solution contained 21% w. of copolymer. The copolymer contained 23.3% w. of bound styrene, the intrinsic viscosity was 0.51.

The solution was concentrated to 50% w. and was used in this concentration to apply a film to tinplate (thickness as in Example I). After heating at 200° C. for 20 minutes, this film was found to have the following properties:

Adhesion (DIN 53151 rating 1) _____ Excellent
Erichsen impact resistance in mm. _____ 5.0
Bending test after heating with steam (see Example I), inches _____ 1/16
Hardness (see Example I) _____ H (good)
Ditto after treatment with xylene _____ F (fair)

EXAMPLE V

According to the recipe given in Example I, 50 p.b.w. of isoprene was copolymerized with 50 p.b.w. of piperylene. The quantity of tertiary dodecylmercaptan used for this polymerization, however, amounted to 0.05 instead of 3.0 p.b.w. When a 70% monomer conversion had been reached, the reaction was stopped according to the procedure indicated in Example I. Non-converted monomer was removed by distillation with steam.

The resulting latex contained 20% w. of solid matter and was further treated according to the methods described in Example II, with the difference, however, that the polymer-containing top layer was successively washed with an equal volume of water, twice with an equal volume of 3% w. aqueous NaOH solution and finally twice with an equal volume of water.

The final product was a clear 21% w. solution of the copolymer in isooctane, in which solution the presence of dissolved non-rubber-like components could no longer be demonstrated. The copolymer contained 22% piperylene and 78% w. isoprene. The intrinsic viscosity amounted to 1.7.

After dilution with 2,2,4-trimethylpentane to a polymer concentration of 10% w. the polymer solution was freed from oxygen by passing through nitrogen and then hydrogenated with the aid of a catalyst of the Ziegler type. Owing to this treatment the number of double bonds in the copolymer was easily reduced to less than half.

EXAMPLE VI

According to the recipe given in Example I 100 p.b.w. of piperylene was polymerized. For this polymerization no tertiary dodecylmercaptan was used; as initiator 0.12 p.b.w. of phenylcyclohexane hydroperoxide was applied. When a monomer conversion of 62% had been reached, the reaction was stopped.

According to the procedure indicated in Example I, 100 p.b.v. of the latex thus obtained, still containing non-converted monomer and 23% w. of solid matter, was further treated. The non-converted monomer was removed during the distilling off of the wash water left. The final product was a clear solution in white spirit 130–180, which solution contained 24% w. of polypiperylene. The IV of this polymer amounted to 0.9. After 0.2% w. of cobalt naphthenate (calculated on solution) had been added, the solution was used to apply a film to tinplate at 20° C. After 24 hours, the film was found to have become a hard protective coat.

EXAMPLE VII

Butadiene and styrene were copolymerized in a feed ratio of 70 p.b.w. butadiene and 30 p.b.w. styrene according to the recipe given in Example I. The polymerization was terminated after 65% monomer conversion had been reached. After removal of non-converted monomer by distillation with steam the resulting latex contained 25% w. of solid matter. The IV of the copolymer amounted to 0.21 and the content of bound styrene to 23.9% w.

According to the method described in Example I, 100 p.b.v. of the latex was further treated, after which a solution in white spirit 130–180 was obtained as a final product, which solution, after concentration by distilling off part of the solvent, contained 52.5% w. of copolymer.

A second batch of 100 p.b.v. of the same latex was treated in almost the same way as the first. Instead of white spirit 130–180, however, a solvent with a higher degree of viscosity was used, namely "Solvent 140 F," a special gasoline with a viscosity of 1.2 centipoises (at 25° C.) and a boiling range of between 180 and 220° C. The polymer solution obtained with the aid of this solvent was then concentrated to a polymer content of also 52.5% w. by distilling off part of the "Solvent 140 F."

As appears from the table below, the viscosity of the solvent largely influences the viscosity of the polymer solution. At the same time, this table shows that when a low viscosity of the polymer solution is desirable a low-viscosity solvent is to be preferred.

In a comparative experiment the addition of NaCl was omitted. The separation after the heating in this case was far from complete, the aqueous layer containing 13% by weight of copolymer.

EXAMPLE X

A solution of a high molecular weight copolymer of butadiene and styrene was prepared according to the recipe of Example IX, but for the following differences:
(1) Instead of 18 parts by volume of a solution of

| Concentration of butadienestyrene copolymer (IV=0.21) in solvent | Nature of solvent | Viscosity of solvent at 25° C. centipoises | Viscosity of polymer solution at 25° C., centipoises, determined with a drage viscometer cup Cd at— | | |
|---|---|---|---|---|---|
| | | | 20.5 | 64 | 200 |
| | | | Revolutions per minute | | |
| 52.5 percent w | "Solvent 140 F" | 1.2 | 5.23 | 5.77 | 6.00 |
| 52.5 percent w | "White Spirit 130–180" | 0.8 | <2.47 | 2.05 | 2.22 |

EXAMPLE VIII

Butadiene and styrene were copolymerized according to the procedure described in Example VII. The polymerization was terminated at a monomer conversion of 62%. After removal of the non-converted monomer the resulting latex contained 20% w. of solid matter. The IV of the copolymer amounted to 0.20 and the content of bound styrene to 23.0% w.

100 p.b.v. of this latex was further treated according to the procedure indicated in Example I, the difference being that now xylene instead of white spirit 130–180 was used as a solvent. After to the polymer solution obtained, which contained 19% w. of the polymer, had been added 0.25% w. of cobalt naphthenate (calculated on polymer solution), the solution was heated at 120° C., while air was passed through, until the copolymer present in the solution contained 5.6% w. of oxygen. This "blown" copolymer could be worked up better with ureum formaldehyde resins than an unblown copolymer otherwise prepared according to the same method.

EXAMPLE IX

A solution of a high molecular weight copolymer of butadiene and styrene was prepared according to a recipe which was distinguished from the one given in Example I by the following points:
(1) As an emulsifier instead of 4.0 parts of sodium salt of "Versatic" acid 4.7 parts by weight of Dresinate 515 (resinic acid soap) were used.
(2) Instead of 170 parts of water 190 parts by weight were used.
(3) Only 0.23 parts by weight of tert.dodecylmercaptan were used.
(4) The polymerization was continued until a 63% conversion of the monomers was obtained.
(5) No NaOH was added when the polymer was creamed.
(6) Instead of 100 parts by volume of white spirit 400 parts by volume of cyclohexane were used.
(7) The heating under reflux was continued for 4 hours.

After the heating under reflux spontaneous segregation into two layers occurred. The aqueous layer was free from copolymer. The organic layer was extracted 5 times with an equal volume of water. After flashing off most of the remaining water under reflux, the rubber solution was passed through a molecular sieve to remove the last traces of water. A clear solution resulted with a copolymer concentration of about 5%.

20% w. NaCl in water, 20 parts by volume of that solution were used.
(2) Together with the NaCl solution, 3 parts by volume 14 percents aqueous solution of $H_2SO_4$ were added.
(3) The extraction was carried out once with an equal volume of water, 3 times with an equal volume of 5% aqueous ammonia and twice with an equal volume of water.

A clear rubber solution resulted.

EXAMPLE XI

A solution of a high molecular weight copolymer of butadiene and styrene was prepared according to the recipe of Example IX, but for the following differences:
(1) Instead of 18 parts by volume of a solution of 20% w. NaCl in water, 40 parts by volume of that solution were used.
(2) The treatment with cyclohexane occurred at 20° C. with stirring.
(3) The organic layer was 8 times extracted with an equal volume of water.
(4) Water dispersed in the rubber solution was removed by distillation under vacuum at 60° C., while nitrogen was passed through the solution.

The result was as good as in the previous sample.

EXAMPLE XII

A polymer solution was prepared as in Example IX, but only 325 parts by volume of cyclohexane were used and the treatment with cyclohexane was carried out at 20° C. with stirring during 2½ hours. After segregation of the mixture into two layers and separation of the rubber solution from the aqueous layer, the rubber solution was extracted with water. The water remaining in the solution was removed by passing the solution over polypropylene wool (8 denier, average diameter 35 micron) and further by distillation and contact with a molecular sieve.

Any trace of oxygen was removed from the copolymer solution by passing nitrogen through. A hydrogenation catalyst was prepared by mixing 0.05 mmol nickel diisopropylsalicylate and 0.2 mmol aluminum triisobutyl at 40° C. in 5 ml. isooctane. Five minutes after mixing the catalyst components the mixture was added to the copolymer solution. The hydrogenation was carried out at 40° C. at a hydrogen pressure of 1 atmosphere. After one hour a second portion of catalyst prepared in the same way as the first portion was added. After 21 hours all the double bonds had been hydrogenated.

Properties of the hydrogenated product:

Intrinsic viscosity _____ 2.2
Tensile strength _____kg./cm.$^2$__ 277
Elongation at break _____percent__ 580
Modulus at 300% elongation _____kg./cm.$^2$__ 37

EXAMPLE XIII

A copolymer of butadiene and acrylonitrile was prepared according to the recipe of Example I, but for the following differences:

(1) 93 parts of butadiene were copolymerized with 7 parts of acrylonitrile.
(2) Only 2 parts of the emulsifier were used.
(3) 3.5 parts of dodecylmercaptan were used.
(4) The conversion amounted to 70%.

The latex was treated in accordance with Example I so as to obtain a solution of the copolymer in white spirit. The intrinsic viscosity of the copolymer was 0.21. A film obtained from this solution in the manner described in Example I had the following properties:

Film thickness, mm _____ 0.008–0.015
Adhesion _____ Excellent
Flow _____ Do
Hardness on tinplate _____ H
Impact resistance on tinplate, mm _____ 5
Mandrel bend, inches _____ 1/16

The mechanical properties were not affected by treatment with xylene for 15 minutes at 20° C. or by treatment with steam for 30 minutes at 125° C. The latter test did not change the appearances of the film; no blistering occurred.

We claim as our invention:

1. The process for the preparation of a solution of a polymer of a compound with at least one olefinically unsaturated bond and having a molecular weight of from about 100 to about 100,000 comprising
    (1) creaming an aqueous latex of said polymer by adding thereto an electrolyte to produce a cream layer and a serum layer;
    (2) contacting the creamed latex with a polymer solvent phase consisting essentially of a water-insoluble solvent selected from hydrocarbons and halogenated hydrocarbons boiling in the range of from about 35° C. to 250° C. in a quantity sufficient to dissolve substantially all of the polymer, whereby a solution of the polymer is formed;
    (3) and separating the solution from aqueous components of the original latex.

2. A process according to claim 1, in which the contact between the creamed polymer and the solvent phase takes place in the presence of the whole serum layer.

3. A process according to claim 1, in which the contact between the creamed polymer and the solvent phase takes place in the presence of at least the fourth part of the serum layer.

4. A process according to claim 1, in which the contact between the creamed polymer and the solvent phase takes place in the presence of a part of the serum layer in which the average polymer concentration is higher than the average polymer concentration of the serum layer as a whole.

5. A process according to claim 1, in which the contact between the cream and the solvent phase takes place at temperatures between 40 and 250° C.

6. A process according to claim 1, in which the solvent phase consists of one or more hydrocarbons.

7. A process according to claim 1, in which halogenated hydrocarbons ae used as a solvent.

8. A process according to claim 1, in which the polymers are polymers of conjugated dienes.

9. A process according to claim 1, characterized in that polymers are copolymers of styrene and conjugated dienes having an average molecular weight between 100 and 12,000.

References Cited

UNITED STATES PATENTS

| | | | |
|---|---|---|---|
| 2,495,135 | 1/1950 | Rodman | 260—33.6 |
| 2,647,101 | 7/1953 | Humphrey | 260—33.6 |
| 3,218,278 | 11/1965 | Leydon et al. | 260—33.6 |

OTHER REFERENCES

L. Bateman: "The Chemistry and Physics of Rubber like Substances," Maclaren and Sons, London, 1963, Call No. TS1892 B33. pp. 3 and 4 relied upon.

MORRIS LIEBMAN, *Primary Examiner.*

J. E. CALLAGHAN, *Assistant Examiner.*

U.S. Cl. X.R.

260—33.8